United States Patent [19]

Kino et al.

[11] 3,953,825

[45] Apr. 27, 1976

[54] ELECTRONICALLY FOCUSED IMAGING SYSTEM AND METHOD

[75] Inventors: Gordon S. Kino, Stanford; Calvin F. Quate, Los Altos Hills; James F. Havlice, Los Altos, Calif.

[73] Assignee: The Board of Trustees of Leland Stanford Junior University, Stanford, Calif.

[22] Filed: July 12, 1974

[21] Appl. No.: 487,979

[52] U.S. Cl. .......................... 340/5 MP; 73/67.8 S
[51] Int. Cl.² ................... G01V 1/00; H04B 13/00; H04R 15/00
[58] Field of Search .......... 340/1 R, 5 MP; 73/67.7, 73/67.8 S, 67.9

[56] References Cited
UNITED STATES PATENTS

| | | | |
|---|---|---|---|
| 3,090,030 | 5/1963 | Schuck | 73/67.8 S |
| 3,577,772 | 5/1971 | Perilhou et al. | 340/1 R |
| 3,778,757 | 12/1973 | Houston | 340/5 MP |
| 3,794,964 | 2/1974 | Katakura | 340/5 MP |
| 3,815,409 | 6/1974 | Macovski | 340/1 R |

OTHER PUBLICATIONS

Suckling and Hendrickson, *Image Scanner Using Diode Switching*, The Journal of the Acoustical Society of America, Vol. 45, No. 4, 1969, pp. 892–894.

*Primary Examiner*—Maynard R. Wilbur
*Assistant Examiner*—T. M. Blum
*Attorney, Agent, or Firm*—Flehr, Hohbach, Test, Albritton & Herbert

[57] ABSTRACT

An improved electronically focused imaging system for focusing transmitted acoustic waves into a focal line and for scanning the focal line for waves either reflected or transmitted from an object of interest. The system includes N transducer elements in a transmitter array and N transducer elements in a receiver array. These 2N elements can resolve $N^2$ locations on the object of interest. In one embodiment the transmitter array is pulsed through a delay line that is activated by two, independent, frequency varying chirp signals. In this embodiment the receiver array is focused to scan the focal line and to develop a rectangular raster so that the output of the system is viewable on an oscilloscope or a television screen. In another embodiment the transmitter array is pulsed by a delay line activated by one chirp signal and a 45° raster is developed.

22 Claims, 3 Drawing Figures

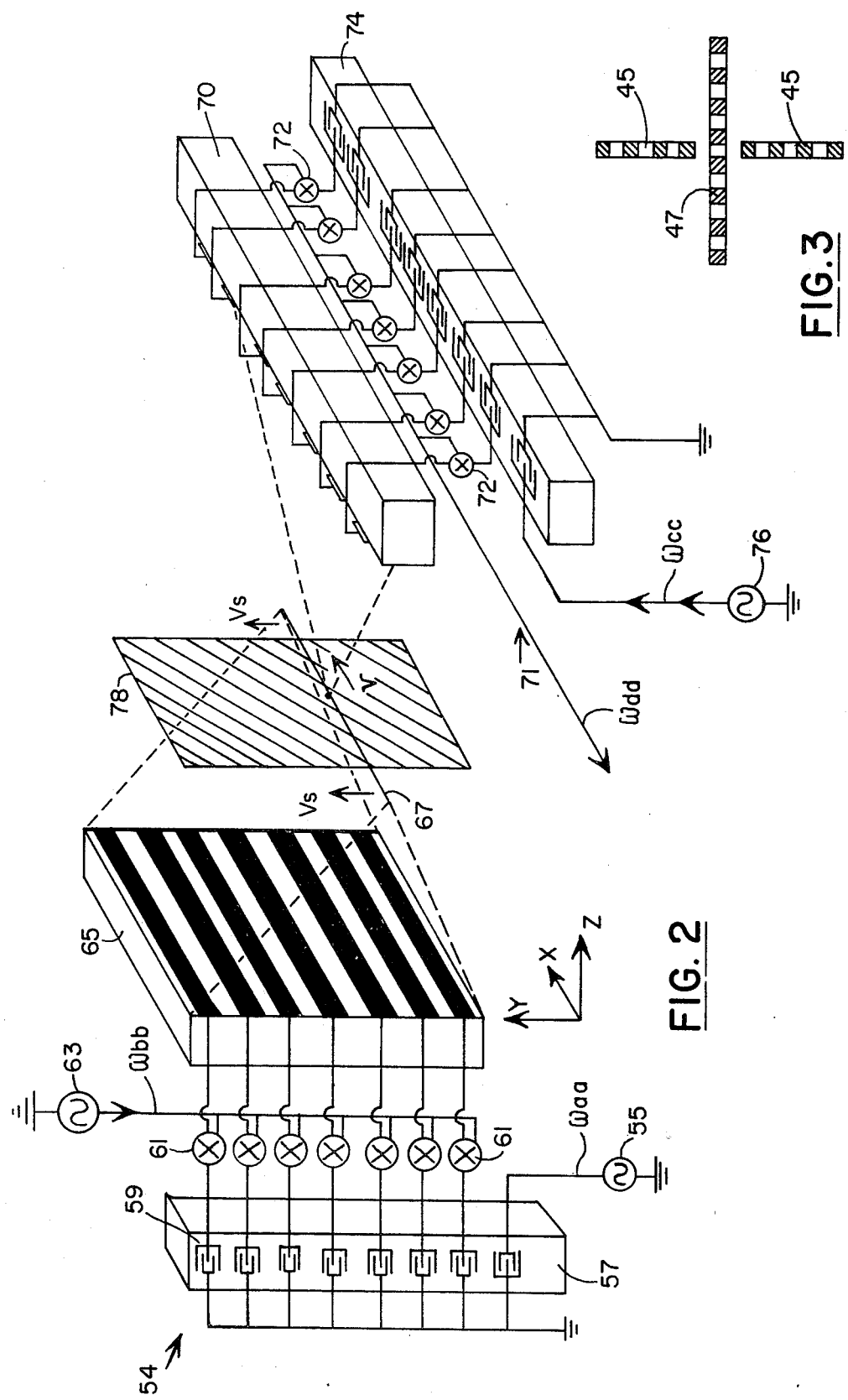

ELECTRONICALLY FOCUSED IMAGING SYSTEM AND METHOD

BACKGROUND OF THE INVENTION

1. Field of the Invention

This invention generally relates to acoustic transmitters and receivers and, more particularly, to systems for generating the images of objects by using acoustic waves.

2. Description of the Prior Art

While the present invention is generally directed to the same field as U.S. Pat. No. 3,875,550 issued on Apr. 1, 1975 and entitled "Electronically Focused Imaging System and Method," the present invention is principally directed to improvements of the inventions therein described and claimed, as will more particularly appear hereinafter. The above identified letters patent bears U.S. Ser. No. 379,760 and was filed on July 16, 1973, by the present inventors and is assigned to the present assignee.

Heretofore acoustic imaging systems have required $N^2$ locations or spots on the object of interest, N being any positive real integer. Although these arrays provide good focusing and image resolution, there is a practical limit on the maximum size of such an array. When arrays having 100 by 100 elements are constructed, the large number of transducers, terminal connections, amplifiers, and other circuit elements required makes the system unduly complex and very cumbersome.

In the above identified letters patent the array of transducers is electrically scanned at the same speed in both the vertical and horizontal directions. Two delay lines are used for each array and a raster, inclined at 45°, is developed by varying the time delay between the horizontal and vertical scans. Since the raster is inclined at 45°, the output from the system can be displayed on an oscilloscope but cannot be readily used for a direct television display without the use of a scan converter. In addition, a 45° raster does not efficiently utilize the corner transducer elements located opposite the major scan diagonal.

SUMMARY OF THE INVENTION AND OBJECTS

The present invention is directed to a method and apparatus for imaging objects of interest with acoustic radiation. The system focuses the transmitted acoustic waves into a focal line and then scans the focal line for waves either reflected or transmitted from the object of interest. The system includes N transducer elements in a transmitter array and N transducer elements in the receiver array. These 2N elements can resolve $N^2$ locations on the object of interest. In one embodiment the system includes a transmitting assembly that is triggered by two independent, frequency varying chirp signals that counterpropagate along a delay line. The transmitter assembly pulses a plurality of transducers so that the transmitted acoustic wave is focused on a focal line. Use of the two counter-propagating chirp signals permits the focal line to scan across the object of interest at a relatively slow speed. The system further includes a plurality of receiving transducers that are electronically focused on the focal line. The receiving transducers rapidly scan along the slowly moving focal line. The combination of the rapid and slow scans produces a rectangular raster having an output suitable for oscilloscope and television presentation.

In another embodiment the array of transmitting transducers is pulsed by a delay line activated by a single chirp signal and a raster inclined at 45° is developed. This can be displayed on an oscilloscope or in a TV display system with the use of a scan converter.

The present invention has immediate application in the field of medical technology. The system can scan selected portions of the human anatomy either by reflecting ultrasonic acoustic radiation off of the object of interest or by transmitting ultrasonic acoustic radiation through the object of interest. Moreover, the present invention can be used for imaging objects in marine applications at lower frequencies and for nondestructive testing of fabricated materials.

It is an object of the present invention to provide a novel method and apparatus that overcomes the limitations and disadvantages of the prior art.

A further object of the present invention is to reduce the number of transducer elements in both the transmitting and the receiving arrays. The present invention contemplates using 2N elements for resolving $N^2$ location spots on the object of interest. Such a reduction in the number of elements simplifies the overall system.

Another object of the present invention is to electrically focus both an array of transmitting transducers and an array of receiving transducers. By focusing both arrays in conjunction with each other the system can more efficiently use its radiated power. In addition, for medical applications where there is a maximum power density limitation, the dual focused system can penetrate more deeply into the anatomy than heretofore possible.

A further object of the present invention is to scan the object of interest at different rates of speed. By using two chirp signals to pulse the transducers, the transmitting array can scan the object of interest at slower speed than the speed of the acoustic wave in the delay line. This slower scanning speed eliminates the focusing aberrations in the transmitted wave. In addition, by using one chirp signal to sequence the transducers in the receiving array, the receiving transducers can rapidly scan along the focal line as the line slowly scans the object of interest. Moreover, a slower scanning speed for receivers or transducers is useful for large, low frequency arrays customarily used at sea.

An additional object of the present invention is to provide a system that develops a rectangular raster that is compatible for oscilloscope and television displays. In one of the preferred embodiments the transmitted wave is focused to a horizontal focal line that slowly moves vertically across the object of interest. During the vertical motion of the focal line, the receiving transducers rapidly scan the horizontal length of the focal line. The difference between the two scanning speeds can be made so large that a raster similar to a conventional television raster is produced.

A further object of the present invention is to provide a controllable, slow speed scanner for both the acoustic transmitting and receiving arrays.

Another object of the present invention is to scan an object of interest in all three dimensions. In one of the preferred embodiments the X and Y dimensions are scanned while the Z dimension is held constant. Thereafter, the fixed Z dimension can be changed a predetermined amount and the X and Y dimensions scanned again. This sequence can be repeated over and over until the Z dimension is completely scanned. As an alternative, either the X or Y dimension can be held constant and the remaining dimensions can be varied to produce a three dimensional scan.

Additional objects and features of the invention will appear from the following description in which the preferred embodiments have been set forth in detail in conjunction with the accompanying drawings.

BRIEF DESCRIPTION OF THE DRAWINGS

FIG. 2 is a diagrammatic, schematic diagram of an alternative embodiment of the improved electronically focused imaging system operating in a transmission mode illustrating a transmitter assembly pulsed by one chirp signal on one delay line, two elongate transducer arrays with 2N elements, a raster inclined at 45° and a receiver assembly; and FIG. 3 is a schematic diagram of an additional embodiment of the imaging system illustrating two transducer arrays of 2N elements orthogonally disposed with respect to each other.

DESCRIPTION OF THE PREFERRED EMBODIMENTS

Figure 1:
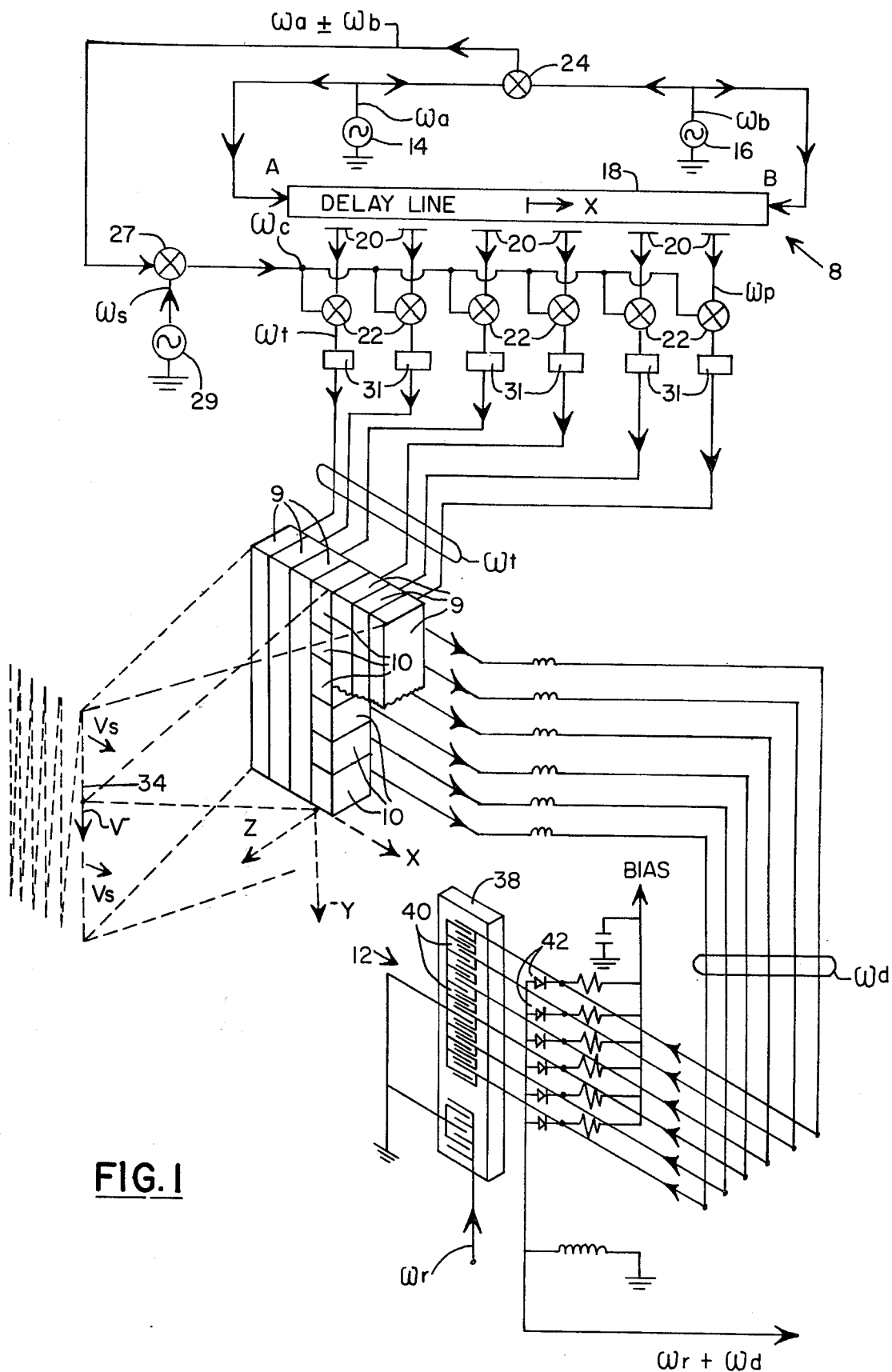
FIG. 1 is a diagrammatic, schematic diagram of an improved electronically focused imaging system operating in a reflection mode illustrating a transmitter assembly pulsed by two chirp signals on one delay line, two elongate transducer arrays with 2N elements, a rectangular raster, and a receiver assembly.

In general, the improved electronically focused imaging system illustrated in FIG. 1 includes a transmitter assembly 8 for providing a plurality of sequenced pulses for driving a plurality of acoustic transmitting transducers 9. The sequenced pulses both drive the transducers and focus the acoustic outputs therefrom. In this preferred embodiment the acoustic waves from the transmitting transducers are reflected off of an object of interest (not shown) and are thereafter incident on a plurality of receiving transducers 10. The transmitting transducers 9 and the receiving transducers 10 are mounted together in a planar array as hereinafter described. The reflected acoustic waves detected by the receiving transducers 10 are scanned by a receiver assembly 12 and are converted into a form viewable on an oscilloscope (not shown).

The transmitter assembly 8 includes two conventional signal generators 14, 16. Each signal generator provides an output signal $\omega_a$, $\omega_b$ that has a frequency that varies linearly with time. These frequency varying signals are also known as chirp signals. The output $\omega_a$ of the signal generator 14 is connected to the A end of a delay line 18. The output $\omega_b$ of the signal generator 16 is connected to the B end of the delay line 18. The delay line is a conventional acoustic surface wave delay line with a plurality of surface wave taps 20 that are spaced along the length of the delay line. These taps are interdigital electrodes connected so that when the output signals from the signal generators 14, 16 propagate down the delay line each tap in turn receives a timed electrical signal. The output signal from each tap has a frequency $\omega_p$. Each tap is connected to a mixer 22 hereinafter described. In one embodiment of the present invention the mixers 22 were simple mixers that used field effect transistors to provide high conversion efficiency and prevent overloading the delay line.

The signal generators 14, 16 are also connected to a mixer 24 that has an output of $\omega_a \pm \omega_b$. The mixer 24 is a conventional central double balanced diode mixer. The output $\omega_a \pm \omega_b$ is supplied to a modulator 27 that combines the output from the mixer 24 with the output from a third signal generator 29. The third signal generator has an output of $\omega_s$ and the output of the modulator is $\omega_c$. For clarity these outputs have been indicated on FIG. 1.

The mixers 22 combine the output $\omega_c$ of the modulator 27 with the individual outputs $\omega_p$ of the taps 20. The mixers 22 thereby convert the signal $\omega_p$ from the frequency of the delay line to the resonant frequency of the transmitting transducers 9. The mixers 22 can be simple field effect transistor-type mixers. The output of each mixer is connected to an amplifier 31 so that the signal level from the mixers is brought up to a usable level for driving the transmitting transducers 9. It should be noted that each mixer 22 and amplifier 31 is connected to a single transmitting transducer 9.

The transmitting transducers 9 are a plurality of elongate, vertically orientated, piezoelectric crystals that generate an acoustic wave when individually pulsed by the amplifiers 31. The transducers are arranged side by side in a horizontally orientated, linear array. In one embodiment that was constructed the transducer elements were 9 cms long and 1 mm wide. In that embodiment a total of 15.0 milliwatts of power was delivered to the individual transmitting transducers and approximately 2.8 milliwatts of power was radiated. The mixers 22 were dual gate, field effect transistors that operate at nearly unity conversion gain with a resistive load. The amplifiers 31 were Darlington amplifiers coupled to common emitter power amplifiers.

Using the delay line 18 the transmitter assembly 8 sequentially pulses the individual transducers 9 and thereby focuses the acoustic waves into a line parallel to the Y axis at a distance Z from the array. The array of transducers operates like an electronic cylindrical lens that focuses the transmitted acoustic power into a focal line indicated by reference numeral 34. The focus of the system can be adjusted to locate the focal line in the plane of the object of interest (not shown). As hereinafter described, the focal line 34 can also be sequenced along the X axis, parallel to the Y axis, at a constant distance Z away from the plane of the array and also can be sequenced along the Z axis, parallel to the Y axis, at a constant distance X.

To analyze the focusing of the transmitting transducers 9, auppose the outputs $\omega_a$, $\omega_b$ of the signal generators 14, 16 are, respectively:

$$\omega_a = \omega_1 + \mu_1 t \quad (1)$$

$$\omega_b = \omega_2 + \mu_2 t \quad (2)$$

where $\omega_1$, $\omega_2$ are the initial frequencies and $\mu$ is the frequency sweep rate of the chirp signals. In all of the equations developed herein the subscripts identify the physical location of the variables in the system. The chirp signals $\omega_a$, $\omega_b$ are inserted into the A and B ends of the delay line as hereinbefore described. At a position $x_n$ along the delay line the phase of the signals received by each tap 20 is:

$$\phi_s(x,t) = \omega_1 \left(t - \frac{x_n}{v}\right) + \frac{\mu_1}{2} \left(t - \frac{x_n}{v}\right)^2 + \text{const.} \quad (3)$$

$$\phi_b(x,t) = \omega_2 \left(t - \frac{x_u}{V}\right) + \frac{\mu_2}{2}\left(t - \frac{x_u}{v}\right)^2 + \text{const.} \qquad (4)$$

where $v$ is the propagation velocity of the acoustic wave down the delay line and the zero reference point is at the center of the delay line.

Since the inputs to the modulator 27 include $\omega_s$ from the signal generator 29 and the output $\omega_a + \omega_b$ from the mixer 24, the output $\omega_c$ of the modulator is:

$$\omega_c = \omega_a + \omega_b + \omega_s \qquad (5)$$

Substituting equations 1 and 2:

$$\omega_c = \omega_1 + \omega_2 + \omega_s + (\mu_1 + \mu_2)t \qquad (6)$$

It should be noted, parenthetically, that $\omega_c$ can also be chosen to equal $\omega_1 - \omega_2 \pm \omega_s + (\mu_1 - \mu_2)t$ and $\mu_2$ to have the opposite sign to $\mu_1$. In this case the harmonics such as $2\omega_1, 2\omega_2$ $(2\omega_1 \approx \omega_1 + \omega_2)$ can be easily filtered out.

The phase of the output signal from the modulator 27 is:

$$\phi_c = (\omega_1 + \omega_2 + \omega_s)t + \left(\frac{\mu_1 + \mu_2}{2}\right) t^2 + \text{const.} \qquad (7)$$

The output $\omega_t$ of the mixers 22 is the result of mixing the outputs $\omega_p$ from the taps 20 with the output $\omega_c$ from the modulator. The phase of the resulting signal coming from the mixers 22 is:

$$\phi_t = \phi_a + \phi_b - \phi_c \qquad (8)$$

Substituting equations 1, 2 and 7:

$$\phi_t = \omega_s + \frac{\mu_1 + \mu_2}{2}\left(\frac{x}{v}\right)^2 + (\mu_2 - \mu_1)\frac{xt}{v} \qquad (9)$$

and after regrouping:

$$\phi_t = \omega_s + \frac{\mu_1 + \mu_2}{2}\left[\left(\frac{x}{v}\right) - \left(\frac{\mu_1 - \mu_2}{\mu_1 + \mu_2}\right)t\right]^2$$

$$+ \frac{(\mu_1 - \mu_2)^2 t^2}{2(\mu_1 + \mu_2)} \qquad (10)$$

If the signal $(\omega_t, \phi_t)$ is used to drive the transmitting transducer array 9, the transducers will focus the waves at a focal line 34 located at a distance where the change in phase along the acoustic ray paths is not a function of $x$. In other words, the focus of the acoustic signal is where:

$$\frac{x}{2v} = \left(\frac{\mu_1 - \mu_2}{\mu_2 + \mu_2}\right) t \qquad (11)$$

$$x = 2vt \left(\frac{\mu_1 - \mu_2}{\mu_1 + \mu_2}\right) \qquad (12)$$

The transmitter array focuses the waves on a focal line 34 lying in a cylindrical plane. The axis of symmetry of the cylindrical plane is the Y axis and the focal line is located at a distance Z from the array where:

$$Z = \frac{\omega_s}{(\mu_1 + \mu_2)v^2} \qquad (13)$$

The focal line moves across the object of interest with a translational velocity $v_s$. From equation 12 the translational velocity $v_s$ of the focal line with respect to the array is:

$$v_s = 2v \left(\frac{\mu_1 - \mu_2}{\mu_1 + \mu_2}\right) \qquad (14)$$

If the translational velocity $v_s$ is much smaller than the propagation velocity $v$ of the acoustic wave down a delay line, the transmitter array can focus the wave without creating any serious aberrations due to the difference in the time delays along the different ray paths to the focal lines.

In summary, the transmitting transducers 9 focus the acoustic waves into a focal line 34 and this focal line can be moved relatively slowly across the object of interest. By using two counter-propagating chirp signals in the delay line 18, the focal line moves with a translational velocity $v_s$ across the object of interest that is much smaller than the propagation velocity v of the waves in the delay line. In FIG. 1 the focal line is substantially parallel to the Y axis and is moving along a plane parallel to the X and Y axis, at a constant distance Z away from the transducer array. The focal line can also be sequenced along the Z axis, parallel to the Y axis, at a constant distance X.

In FIG. 1 the system is illustrated operating in a reflection mode. The acoustic wave from the transmitting transducers 9 is reflected off of the object of interest (not shown) and is thereafter incident on a plurality of receiving transducers 10. The receiving transducers are piezoelectric crystals arranged in an upright, vertically orientated linear array centrally disposed to the transmitting transducer array. These transducers sample the amplitude and phase of the incoming acoustic reflection image from the object of interest. In one embodiment of the receiver transducer array 10 that was actually constructed, a thirty element array was made from a strip of piezoelectric material approximately 1 centimeter wide. The transducer elements were spaced apart by 2 millimeters and operated at 4 megahertz with a 50 megahertz signal on the delay line.

Each receiving transducer 10 in the array is sequentially scanned by the receiver assembly 12. An acoustic surface wave delay 38 with a plurality of spaced apart taps 40 is the basic scanning device. Each tap on the delay line is an interdigital electrode as described hereinbefore and there is one corresponding tap for each receiving transducer 10. The output from each tap on the delay line is mixed in a diode mixer 42 with an output from one of the receiving transducers 10.

The operation of the receiver assembly 12 is best explained by considering the situation when a short pulse of frequency $\omega_r$ is sent along the acoustic delay line 38. If the signal received by the receiving transducers 10 has a frequency $\omega_d$, there will be output signals from the individual mixers 42 at frequencies equivalent to $\omega_r + \omega_d$ and $\omega_r - \omega_d$. In the present embodiment an output signal is obtained at the sum frequency ($\omega_r + \omega_d$) only when the pulsed signal $\omega_r$ passes along the delay line, the pulse scans each transducer 10 in turn so that the output may be used to intensity modulate a cathode ray tube, and hence display a visual image corresponding to one line of the acoustic image. The acoustic pulse thus acts like the scanning electron beam in a vidicon.

In one embodiment that was constructed the signal $\omega_r$ inserted into the delay line 38 had a frequency of 50 megahertz and the reflected signal $\omega_d$ received by the transducers had a frequency of between 2 to 5 megahertz. The mixer outputs were summed and the sum frequency was passed through a filter into an output circuit (not shown).

To describe the focusing operation of the receiving transducer array 10 and the receiver assembly 12, an image of a line source of acoustic waves located at a distance $z$ from the detector plane is considered. This line source is analogous to the reflection of acoustic waves off of the object of interest (not shown) at the focal line 34. If the signal emitted from the line source $y_o, z$ varies as $\exp j\omega_s t$, the phase of the signal arriving at a point $y_n$ on the detector array is, in the paraxial approximation:

$$\phi_d = \omega_s \left( t - \frac{z}{v_w} - \frac{(y_n - y_o)^2}{2zv_w} \right) \quad (15)$$

where $v_w$ is the velocity of sound in the medium between the transducers and the line source. In equation 15 there is a square law variation of the phase of the acoustic signal along the plane of the receiving transducers. To cancel this square law variation, an electrical signal $\omega_r$ having a complementary square law variation is sent along the surface wave delay line 38. This electrical signal $\omega_r$ in the delay line has an opposite sense from the signal received by the transducers. Because the receiver assembly 12 combines the signals from the transducers with the signals from the delay line, the output signal $\omega_r + \omega_2$ at the sum frequency has no variation in phase.

The electrical signal inserted into the delay line is a linear FM chirp signal of frequency $\omega_r = \omega_1 + \mu t$. At a point $y_n$ on the delay line the phase of this electrical signal is $$\phi_{dn} = \omega_1 \left( t - \frac{y_n}{v} \right) + \frac{\mu}{2} \left( t - \frac{y_n}{v} \right)^2 \quad (16)$$

where $v$ is the velocity of the wave along the array of receiving transducers 10.

The product of the FM chirp signal and the acoustic image signal has a phase:

$$\phi_n = (\omega_1 + \omega_2)t - \frac{\omega_s z}{v_w} - \frac{\omega_1 y_n}{v} + \frac{\mu}{2}\left(t - \frac{y_n}{v}\right)^2 - \frac{\omega_s(y_n - y)^2}{2zv_w}$$

$$\frac{\omega_s(y_n - y_o)^2}{2zv_w} \quad (17)$$

at the $n^{th}$ tap of the delay line 38.

Thus, the output of the receiver assembly 12 at the sum frequency is of the form:

$$F(t) = {}_A e^{j[(\omega_1 + \omega_s)t - z/v_w]} \sum_{n=0}^{n-1} \left[ \exp \frac{j\mu}{2} \left| t - \frac{nl}{v} \right|^2 \right] \quad (18)$$

$$\times \exp - \frac{j\omega_s(nl - y_o)^2}{2zv_w} \times \exp \frac{-j\omega_1 nl}{v}$$

where: the spacing between the detector elements is $l$; $n$ equals the number of taps; $a$ is a constant; and $x_n = nl$.

When the frequency $\omega_1$ is chosen so that $$\frac{\omega_1 l}{v} = 2m\pi \quad (19)$$

the last term in equation 18 is unity. If the chirp rate $\mu$ is selected so that $$\mu = \frac{\omega_s v^2}{zv_w} \quad (20)$$

at a time $t$ such that $$t = t_o = \frac{y_o}{v} \quad (21)$$

the phases of the electrical signals at all detector elements are equal and all of the contributions from the N taps add together.

Theoretically, if the sweep rate $\mu$ is chosen to correspond to that of equation 20, perfect focusing occurs at a point $y_o$ located at a distance $z$ from the transducers. It should be noted that changing the sweep rate $\mu$ is analogous to changing the focal plane of an electronic lens.

If the series in equation 18 is summed, and the chirp rate is chosen to satisfy equation 20, then:

$$|F(t)| = \left| A \sin \frac{\pi L}{z\lambda} (y_o - vt) \bigg/ \sin \frac{\pi L}{z\lambda N} (y_o - vt) \right| \quad (22)$$

where $L = n \times l$, the width of the transducer array and $\lambda = 2\pi v_w/\omega_s$, the acoustic wavelength.

In summary, the receiving transducer array 10 can be forcused on a point and this point can be adjusted to travel along the focal line 34 of the transmitted acoustic wave. The speed of the point or the scan velocity $v$ of the receiving transducers along the focal line is equal to the velocity of propagation of a wave down the delay line 38. It should be appreciated that the scan velocity of the receiving transducers is substantially more than the translational velocity $v_s$ of the focal line. The translational velocity of the focal line is less because two chirp signals are used in the delay line 18. Thus, the receiving transducers can scan back and forth along the focal line numerous times compared with the relatively slow movement of the focal line.

It should be appreciated that this system develops a rectangular raster that is described by a point moving both in a direction parallel to the Y axis at high velocity and also in a direction parallel to the X axis at low velocity. The raster is focused to scan across the object of interest. By generating a rectangular raster the system is compatible for a television or oscilloscope presentation.

FIG. 2 illustrates an alternative embodiment for sequencing the transmitting assembly and pulsing the transmitting transducers with a single chirp signal. This alternative embodiment operates in a transmission mode. In particular, reference numeral 54 generally indicates a transmitting assembly that includes a signal generator 55 having an output $\omega_{aa}$.

$$w_{aa} = \omega_{11} + \mu_{11} t \tag{23}$$

where $\omega_{11}$ is the initial frequency and $\mu_{11}$ is the frequency sweep rate of the chirp. The delay line is an acoustic surface wave delay line that operates in the same manner as hereinbefore described. The signals on the delay line are picked off by a plurality of taps 58 which are interdigital electrodes equally spaced along the length of the delay line. Each individual tap is connected to a mixer 61 that combines the signals from the delay line with a chirp signal output $\omega_{bb}$ from a second signal generator 63.

$$\omega_{bb} = \omega_{11} + \omega_{ss} \tag{24}$$

It should be noted, parenthetically, that $\omega_{bb}$ can as well be inserted at the output of the signal generator 55. When this is done, it serves to help eliminate the problems with reflections in the delay line because both $\omega_{aa}$ and $\omega_{bb}$, if they are reflected with amplitudes $\tau_a$, $\tau_b$ respectively, have a smaller product of reflection $\tau_a \tau_b$.

Each mixer 61 is connected to a transmitting transducer 65 so that the array can be sequentially pulsed by the outputs of the mixers. These transducers are elongate, piezoelectric crystals vertically stacked side by side in a vertically orientated linear array. The array is sequentially pulsed by the transmitting assembly so that the acoustic waves produced therefrom are focused on a focal line 67 located parallel to the x axis at an elevation of $y_o$ and at a distance of $z_1$ from the array. The focal line is located at this location if:

$$\mu_{11} = \frac{\omega_{ss} v_{11}^2}{z_1 v_w} \tag{25}$$

where $\mu_{11}$ is the frequency sweep rate of the chirp signal $\omega_{aa}$; $z_1$ is the distance from the array 65 to the focal line; $\omega_{ss}$ is a component frequency of the output $\omega_{bb}$ of the signal generator 63; $v_w$ is the velocity of sound in the medium between the transducers and focal line; and $$v_{11} = v_a \frac{L_p}{L_d} \tag{26}$$

where $L_p$ is the space between each transmitting transducer; $L_d$ is the space between the taps on the delay line; and $v_a$ is the acoustic velocity along the delay line 57.

The focal line 67 is positioned at the object of interest (not shown) so that the acoustic waves are incident thereon. In the transmission mode the acoustic waves pass by the object of interest (not shown) without reflection and are thereafter incident on an array of receiving transducers 70. The array of receiving transducers faces the array of transmitting transducers, and the object of interest is normally placed directly between the two arrays. The array of receiving transducers is a plurality of piezoelectric crystals placed in spaced apart relationship along a horizontally oriented linear array. Each transducer is square so that it can receive acoustic waves over a large solid angle.

The receiving transducers 70 are sequentially scanned by a receiving assembly 71. The receiving assembly includes a signal generator 76 having a chirp signal output $\omega_{cc}$.

$$\omega_{cc} = \omega_{22} + \mu_{22} t \tag{27}$$

The signal generator 76 can insert the output $\omega_{cc}$ onto a delay line 74. The delay line is a conventional delay line as hereinbefore described. The signals on the delay line are picked off by a plurality of taps 75 which are interdigital electrodes equally spaced along the length of the delay line. Each tap is connected to a mixer 72 that is in turn connected to a receiving transducer 70. The delay line 74 sequentially scans the receiving transducers 70 in the manner hereinbefore described and an output $\omega_{dd}$ is obtained therefrom.

$$\omega_{dd} = \omega_{22} + \mu_{22} t + \omega_{ss} \tag{28}$$

It should be noted that when $\omega_{bb}$ is inserted into the output of the signal generator 55, as hereinbefore described, $\omega_{dd} = \omega_{22} + \mu_{22} t - \omega_{ss}$. This result is preferable because it does not provide a spurious focused signal corresponding to $t\omega_s$.

The distance $z_2$ between the array of receiving transducers 70 and the object of interest (not shown) is related to the frequency sweep rate $\mu_{22}$ of the chirp signal $\omega_{dd}$ as follows:

$$\mu_{22} = \frac{\omega_{ss} v_{22}^2}{z_2 v_\omega} \tag{29}$$

where $\omega_{ss}$ is a component frequency of the output $\omega_{dd}$ of the signal generator 63; $v_w$ is the velocity of sound in the medium and $$v_{22} = \frac{v'_a l'_p}{l'_d} \tag{30}$$

as defined hereinbefore and now applied to the array of receiving transducers 70.

In the embodiment illustrated in FIG. 2 the receiver assembly 71 is focused on a point and this point scans the object of interest (not shown) in a direction parallel to the X axis. The receiving transducers thus scan along a line described by:

$$x = v_{22} t \tag{31}$$

The transmitting transducers 65 focus the acoustic waves therefrom into the focal line 67 that is parallel to the X axis. The focal line is described by:

$$y = v_{11}(t-\tau) \qquad (32)$$

where $\tau$ is the time delay between the chirp signals $\omega_{aa}$ and $\omega_{bb}$. As hereinbefore described, the focal line travels parallel to the X axis at a constant distance $z_1$ from the transmitting transducers 65 and in a direction parallel to the Y axis.

The focal line 67 intersects the scan of the receiving transducers at the point:

$$y = \frac{v_{11}}{v_{22}} x - v_{11}\tau \qquad (33)$$

In one embodiment that was constructed $v_{11}$ was set equal to $v_{22}$. In that case the system scanned a 45° raster 78 located at a distance $z_1$ from the transmitting transducers and a distance $z_2$ from the receiving transducers. The 45° raster was plane parallel to the X–Y axis. The step by step displacement of the sweep lines of the raster was achieved by varying the time delay $\tau$.

An additional arrangement of the transmitting and receiving transducers is illustrated in FIG. 3. In this embodiment the transmitting transducers 45 are orthogonally positioned with respect to the receiving transducers 47 and each individual transducer in the two linear arrays is spaced apart from its adjacent neighbors. This embodiment is connected to both the transmitter assembly 8 and the receiver assembly 12 in the same manner as hereinbefore described. In operation, the transmitted acoustic waves are focused in a focal line and the focal line slowly moves across the object of interest in a frame scan in the same manner as the embodiment described hereinbefore and illustrated in FIG. 1. Also in a similar manner the receiving transducers are focused to a point on the focal line and the transducers scan the focal line at high speed in comparison with the translational speed of the focal line.

It should be appreciated that all of the embodiments described herein perform like electronic cylindrical lenses. Each array of transmitting transducers focuses the beam of acoustic waves onto a focal line and the focus of the system can be adjusted to locate the focal line in the plane of the object of interest.

Moreover, each embodiment comprises two arrays of N transducers where N is any real number of each array can have a different number of elements. These N transducers can scan either a raster or an object of interest having at least $N^2$ resolvable points or locations thereon. Thus, the number of transducers and the amount of associated circuitry required to resolve $N^2$ points is substantially reduced over the prior art.

It is comtemplated that the present invention includes interchangeably placing the transmitting and receiving transducers in opposing relationship and operating the system in a transmission mode as well as placing both arrays in co-planar relationship and operating the system in a reflection mode. In either the reflection or the transmission mode the imaging system will scan the raster appropriate to the respective transmitting and receiving assemblies.

It should also be appreciated that although the delay line disclosed herein is an acoustic surface wave delay line, it is contemplated that other delay lines can be used. Such delay lines include a charge coupled delay line, currently used for optical imaging and an electromagnetic delay line. In addition, the combination of a shift register and a digital to analog converter can be used for a delay line when operating at low frequencies.

Although the best mode contemplated for carrying out the present invention has been herein shown and described, it will be apparent that modification and variation may be made without departing from what is regarded to be the subject matter of the invention.

We claim:

1. An acoustic imaging apparatus for transmitting focused acoustic waves at an object of interest for scanning the focused waves incident on the object of interest, comprising:
   a linear array of acoustic wave transmitting transducers;
   means for generating chirp signals that focus the acoustic waves transmitted by the array;
   means connected to the chirp signal generating means for sequencing said chirp signals and for generating focusing pulses, said array being connected thereto for receiving said pulses and for generating from the focusing pulses acoustic waves focused into a focal line;
   a linear array of receiving transducers proximate to the array of transmitting transducers for receiving the acoustic waves from the transmitting transducers; and
   scanning means in a receiver assembly connected to the array of receiving transducers for scanning the focal line with the array of receiving transducers.

2. The apparatus of claim 1 wherein the sequencing means includes means connected to said transmitting transducers for translationally moving the focal line along a plane substantially parallel to the array of transmitting transducers.

3. The apparatus of claim 1 wherein the sequencing means further includes means connected to said transmitting transducers for translationally moving the focal line with respect to the array of transmitting transducers at a substantially different speed than the speed of the sequencing means.

4. The apparatus of claim 1 wherein the array of transmitting transducers is a linear array of N elements and the array of receiving transducers is a linear array of M elements, N and M being any real positive number, such that the apparatus resolves the object of interest into at least NM spots or location points.

5. The apparatus of claim 1 wherein the scanning means includes means for focusing the receiving transducers on a point on the focal line and for moving said point therewith.

6. The apparatus of claim 1 wherein the sequencing means includes a shift register connected to a plurality of digital to analog converters, said digital to analog converters being connected to the transmitting transducers.

7. The apparatus of claim 1 wherein the sequencing means is a charge coupled delay line.

8. The apparatus of claim 1 wherein the array of transmitting transducers is disposed about the array of receiving transducers so that the apparatus operates in a reflection mode.

9. The apparatus of claim 1 wherein the array of transmitting transducers is disposed opposite to the array of receiving transducers so that the apparatus operates in a transmission mode.

10. The apparatus of claim 1 wherein the chirp signal generating means further includes means for electronically varying the focal length of the transmitted acous- 11. An acoustic imaging apparatus for transmitting focused acoustic waves at an object of interest and for scanning the focused waves incident on the object of interest, comprising:
   an array of acoustic wave transmitting transducers;
   means for generating chirp signals that focus the acoustic waves transmitted by the array;
   a delay line connected to the chirp signal generating means and activated by two counterpropagating chirp signals, said delay line sequences pulses for focusing the transmitted acoustic waves into a focal line, said array being connected thereto for receiving said pulses and for generating from the pulses acoustic waves focused into the focal line;
   an array of receiving transducers proximate to the array of transmitting transducers for receiving the acoustic waves from the transmitting transducers; and
   a second delay line activated by a chirp signal and connected to the array of receiving transducers, for scanning the receiving transducers for acoustic phase and amplitude information about the object of interest.

12. The apparatus of claim 11 further including a modulator for focusing the transmitted acoustic waves by forming the pulses into driving signals of constant frequency, said modulator being connected to the output of the delay line.

13. The apparatus of claim 11 wherein the delay lines are acoustic surface wave delay lines.

14. An apparatus for generating sequenced driving pulses for an array of transmitting transducers, comprising:
   a first signal generator producing a first chirp signal output;
   a second signal generator producing a second chirp signal output;
   a delay line having two input terminals and being connected to receive said first and second chirp signals at said input terminals and to counterpropagate said chirp signals in said delay line;
   a plurality of taps attached to said delay line in spaced apart relationship for picking off signals from the counterpropagating chirp signals;
   a first mixer connected to the first and second signal generators for receiving the first and second chirp signal outputs therefrom;
   a modulator connected to a third signal generator and to the output of the first mixed, said modulator having an output equivalent to the outputs of the first, second, and third signal generators;
   a plurality of signal mixers each connected to the output of the modulator and to one of the taps on the delay line so that the output from the signal mixers are sequenced driving pulses.

15. The apparatus of claim 14 wherein the delay line is an acoustic surface wave delay line and the taps are interdigital electrodes.

16. An acoustic imaging apparatus for transmitting focused acoustic waves at an object of interest and for scanning the focused waves incident on the object of interest, comprising:
   a first signal generator producing a first chirp signal output;
   a delay line activated by the first chirp signal, said delay line being connected to the first signal generator for receiving signals therefrom;
   a plurality of taps attached to said delay line in spaced apart relationship for picking off signals from the chirp signals;
   a second signal generator producing a second chirp signal output;
   a plurality of signal mixers each connected to the second signed generator and to one of the taps on the delay line, said signal mixers generate sequenced focusing pulses;
   an array of transmitting transducers generating from the pulses acoustic waves focused into a focal line, each of the transducers being attached to one of the signal mixers;
   an array of receiving transducers proximate to the array of transmitting transducers for receiving the acoustic waves from the transmitting transducers; and
   means for scanning the focal line with the array of transducers, said scanning means being connected to the array of receiving transducers.

17. A method of imaging objects of interest with acoustic waves, comprising the steps of:
   focusing transmitted acoustic waves on a focal line using chirp signals from first chirp generating means and an array of transmitting transducers;
   moving the focal line with respect to the object of interest by varying said chirp signals;
   focusing an array of receiving transducers on the focal line using chirp signals from second chirp generating means; and
   scanning the receiving transducers in a predetermined sequence for acoustic signals received from the object of interest.

18. The method of claim 17 further including the step of varying electronically the focal length of the transmitted acoustic waves.

19. The method of claim 17 wherein the step of focusing includes the steps of counter-propagating two chirp signals in a delay line to develop sequenced focusing pulses and driving the array of transmitting transducers with the pulses.

20. A method of imaging objects of interest with acoustic waves, comprising the steps of:
   generating sequenced focusing pulses with a first delay line;
   driving an array of transmitting transducers with the focusing pulses so that acoustic waves produced from the transducers are focused in a focal line;
   moving the focal line translationally along a plane substantially parallel to the array of transmitting transducers at a predetermined speed with respect to the object of interest;
   receiving the acoustic waves from the object of interest with an array of receiving transducers; and
   scanning the focal line at a predetermined speed using the receiving transducers and a second delay line.

21. The method of claim 20 wherein the focal line is moved at a relatively slow speed and the receiving transducers scan the focal line at a relatively fast speed so that a substantially rectangular raster is developed.

22. The method of claim 20 wherein the focal line is moved at the same speed as the receiving transducers scan the focal line so that a substantially 45° raster is developed.

* * * * *